United States Patent [19]
Maeda et al.

[11] Patent Number: 5,774,623
[45] Date of Patent: Jun. 30, 1998

[54] VIDEO IMAGE AND AUDIO SOUND SIGNAL PROCESSOR HAVING SIGNAL MULTIPLEXER AND SINGLE DATA COMPRESSION SYSTEM FOR DIGITAL VIDEO RECORDING AND PLAYBACK APPARATUS

[75] Inventors: Eiichi Maeda, Kawasaki; Norihiro Sakaguchi, Yokohama, both of Japan

[73] Assignee: Ricoh Company, Ltd., Tokyo, Japan

[21] Appl. No.: 629,900

[22] Filed: Apr. 10, 1996

[30] Foreign Application Priority Data

Apr. 12, 1995 [JP] Japan .................................... 7-086955

[51] Int. Cl.⁶ ............................ H04N 5/76; H04N 5/225; H04N 5/92
[52] U.S. Cl. .............................. 386/98; 386/101; 386/39; 348/432
[58] Field of Search ........................ 386/33, 39, 96–107, 386/109, 111, 112; 358/909, 1, 906; 348/232, 432–436, 462, 480, 481, 482, 483, 484, 485, 512, 513–515; H04S 5/225, 5/76, 9/79, 7/12, 11/02, 11/04

[56] References Cited

U.S. PATENT DOCUMENTS

| | | | |
|---|---|---|---|
| 4,816,926 | 3/1989 | Moriwaki et al. ...................... | 386/101 |
| 5,081,538 | 1/1992 | Takei et al. .............................. | 386/101 |
| 5,418,853 | 5/1995 | Konota et al. ............................ | 386/98 |
| 5,479,299 | 12/1995 | Matsumi et al. .......................... | 386/98 |
| 5,497,194 | 3/1996 | Sakagami et al. . | |

*Primary Examiner*—Thai Tran
*Attorney, Agent, or Firm*—Oblon, Spivak, McClelland, Maier & Neustadt, P.C.

[57] ABSTRACT

A video image and audio sound signal processor having a signal multiplexer and a single data compression system for a video image recording and playback apparatus. An audio sound signal is sampled in accordance with a timing signal in synchronism with a horizontal synchronizing signal of a video image signal, and such a sampled audio sound signal is then multiplexed onto an end of the video image signal, which is then converted into a digital signal by a single A/D (analog to digital) converter. Such a multiplexed digital signal containing video image data and audio sound data is then sent to a data converter wherein raster data are converted into a plurality of data blocks, each of such data blocks including a plurality of picture elements in both horizontal and vertical directions. And then, the data blocks are sent to a single compression device.

58 Claims, 9 Drawing Sheets

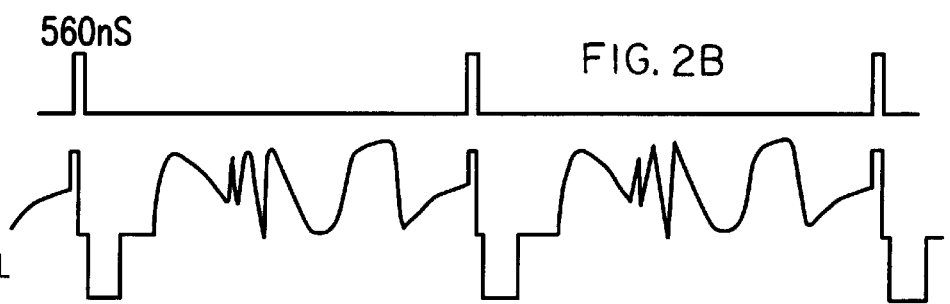
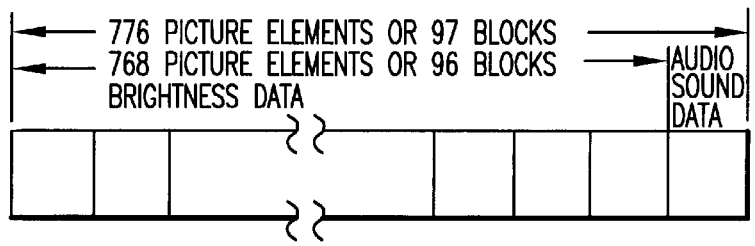
FIG.3
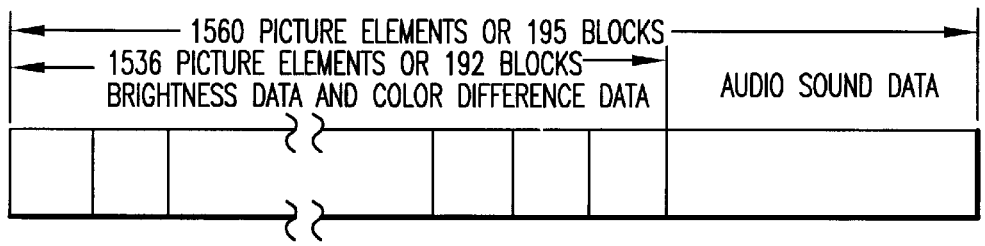
FIG.4

VIDEO IMAGE AND AUDIO SOUND SIGNAL PROCESSOR HAVING SIGNAL MULTIPLEXER AND SINGLE DATA COMPRESSION SYSTEM FOR DIGITAL VIDEO RECORDING AND PLAYBACK APPARATUS

BACKGROUND OF THE INVENTION

1. Field of the Invention

This invention relates to a video image and audio sound signal processor for a digital video recording and playback apparatus, and more particularly to a video image and audio sound signal processor having a signal multiplexer and a single data compression system.

2. Discussion of the Background

As digital video recording and playback apparatuses wherein a video image signal and an audio sound signal are converted into digital signals for processing, there are known various kinds of apparatuses such as, for example, a digital still video camera, a digital VCR (videocassette recorder), a digital TV (television) conferencing system, and the like, most of which have been recently introduced. In these new digital video recording and playback apparatuses, various storage media having a large storage capacity, such as, for example, a videotape, a memory card, a hard disk, a MO (magneto-optical) disk, or the like, are used for storing a video image and an audio sound, which data contains a huge amount of information. Introduction of these new digital video recording and playback apparatuses is owed largely to the development of coding technologies and standards for analog to digital conversion and data compression. For example, there is a DCT (discrete cosine transform) technology for compressing image data, which is widely applied to data compression formulas by various standardization expert groups, such as, JPEG (joint photographic coding experts group) and MPEG (moving picture experts group), and a PCM (pulse code modulation) technology for converting analog sound signals into digital sound data, which is widely known as a basic coding technology for sound data. Two different fields of science, audio sound and video image, have established their coding technologies and standards in a different way. The audio sound field is based on a coding technology for a telephone voice and the video image field is based on a coding technology for a television image.

When an image is shot by a digital video recording and playback apparatus, regardless of whether the image is a motion image or a still image, the image is converted into optical information through a lens of the digital video recording and playback apparatus, and such optical information is further converted into an electrical signal, or a video image signal, by a CCD (charge coupled device). Generally, such a video image signal is separated into a brightness signal and two color difference signals by a video image signal processor, and such signals are further converted into a digital signal by a converter. On the other hand, when a sound is picked up by a microphone, for example, of a digital video recording and playback apparatus, a vibration of the sound is thereby converted into a primitive electrical signal, and then such a signal is led to an audio sound signal processor and is formed into an analog audio sound signal. Then, the analog audio sound signal is converted into a digital audio sound signal by, for example, a PCM (pulse code modulation) technology which is embedded in the audio sound signal processor.

Generally, two separate signal processors, one for video image signal processing and the other for audio sound signal processing, are installed in a digital video recording and playback apparatus for efficiently recording video image data and audio sound data into its storage media and for playing them back. Such two processors are similarly structured and both include, for a recording mode, for example, an analog to digital converter and a data compression system which includes a data format converter, a data coder, a data compressor, and a data bus, and both include for a playback mode, for example, a digital to analog converter and another data compression system which includes a data format inverse converter, a data decoder, a data decompressor, and another data bus. Despite such a structural similarity between the two processors as described above, two separate signal processors are still generally provided in a digital video recording and playback apparatus.

In the meantime, a video image signal processor and an audio sound signal processor have been improved respectively in an aspect of, for example, increasing data handling efficiency, simplifying an electrical circuitry, or the like. One of such improvements is disclosed in the official gazette for Laid Patent Application TOKUKAI HEI 4-257184, which is related to a data coding device for a data compression system.

As an example of simplifying circuitry, it is widely practiced that a video image signal processor and an audio sound signal processor share a single A/D (analog to digital) converter for recording and a single D/A (digital to analog) converter for playing back, on a time division basis. However, a data compression system for a video image signal processor and an audio sound signal processor, which occupies a relatively large space in the signal processor respectively, is not shared by the video image signal processor and the audio sound signal processor, even though each of the data compression systems for the video image signal and audio sound signal includes respectively similar devices for recording, such as, a data compressor, a data coder, a data format converter, and a data bus, and further, devices for playback, such as, a data decompressor, a data decoder, a data format inverse converter, and another data bus.

An exemplary attempt of applying a DCT (discrete cosine transform) method to data compression for an audio sound has been made only lately because the DCT (discrete cosine transform) has become available in a relatively small sized device only lately. Even with such recent development in the DCT (discrete cosine transform) technology, there still remains a problem that control of two separate signal processors for sharing a single data compression system on a time division basis requires a relatively complex circuit.

As described above, circuits for a video image signal processor and an audio sound signal processor which are currently available are respectively large, and are not suitable for a compact digital video recording and playback apparatus, such as a digital still video camera, which is desired to be ideally small in its size and superior in portability.

SUMMARY OF THE INVENTION

The present invention has been made in view of such problems, and therefore, an object of the present invention is to provide a novel compact video image and audio sound signal processor which fits in a small digital video recording and playback apparatus, such as, a digital still video camera.

In order to achieve the above-mentioned objects, a video image and an audio sound signal processor according to the present invention includes, for performing a recording of a video image signal and an audio sound signal, a sample-andhold circuit for sampling an analog sound signal in accordance with a timing pulse which is in synchronism with a horizontal synchronizing signal of a video image signal, and holding such a sampled signal. A multiplexer multiplexes an audio sound signal onto a video image signal by inserting the audio sound signal at the end of a video image signal for each raster line. Further, also provided are an A/D (analog to digital) converter, a timing pulse generator for generating timing pulses to control the multiplexer, a raster data to block data converter for converting the composite digital video image and audio sound data an a raster format into block data, whose block is comprised of, as an example, 8 by 8 picture elements, and assigning one block immediately following the video image data blocks for audio sound data, and a data compressor, having a DCT (discrete cosine transform) device, a quantization circuit, a plurality of quantization tables, and a quantization table selector, for compressing such block formed composite digital video image and audio sound data.

Further, for performing a playback of a recorded image and sound, a video image and audio sound signal processor according to the present invention includes a data decompressor and a block data to raster data converter, by which the compressed composite digital video image and audio sound data is decompressed and converted back into composite digital video image and audio sound data in a raster format. Moreover, the video image and audio sound processor according to the present invention further includes a D/A (digital to analog) converter, a demultiplexer for demultiplexing an analog audio sound signal from the composite analog video image and audio sound signal in accordance with a timing pulse generated by the timing pulse generator, and an inverse sample-and-hold circuit for finishing up an analog audio sound signal.

By multiplexing two separate signals, a video image signal and an audio sound signal, in a way as described above, it becomes possible that various devices for recording, such as, an A/D (analog to digital) converter, a data format converter, a data coder, a data compressor, and a data bus, and further, devices for playing back, such as, a digital to analog converter, a data format inverse converter, a data decoder, a data decompressor, and another data bus, are shared for processing the video image signal and the audio sound signal. As a result, it becomes possible that two separate processors, a video image signal processor and an audio sound signal processor, are combined in a single cohesive signal processor for a video image and an audio sound in a size which is small enough to fit into a compact digital video recording and playback apparatus, such as a digital still video camera.

Further, a video image and audio sound signal processor may include a raster data and block data converter which is capable of assigning, as an example, four data blocks, instead of one block, immediately following data blocks of the video image data, to audio sound data, in accordance with an interleave format defined by JPEG (joint photographic coding experts group), thereby maintaining the entire data stream including the video image data and audio sound data conformable to the interleave format defined by JPEG (joint photographic coding experts group). In this case, a video image, which is recorded by a video image and audio sound signal processor according to the present invention, can be reproduced by any playback apparatus conforming to JPEG (joint photographic experts group). However, the audio sound data cannot be reproduced by such an apparatus, since such an apparatus does not include a demultiplexer for demultiplexing an audio sound signal from the composite video image and audio sound signal.

Further, a video image and audio sound signal processor may include, for improving audio sound quality, a delay circuit for delaying an audio sound signal, which is sampled at a frequency of twice as fast as the horizontal synchronizing signal of the video image signal, so that an audio sound signal sampled at a middle of a horizontal image effective period is multiplexed in a position immediately following the audio sound signal sampled at a beginning of a horizontal image effective period. A quantization table memory may also be provided in a quantization device in a data compression circuit for memorizing exclusively a quantization table for quantizing audio sound data. A quantization table memory may further be provided in a quantization device in a data compression circuit for memorizing a quantization table for quantizing both the color difference data and audio sound data.

Yet further, a video image and audio sound signal processor may include a digital signal processing circuit, in place of a video image signal separating circuit, which has a function of separating an analog video image signal into a brightness signal and two color difference signals and which is one of the largest devices in a video image and audio sound signal processor due to its an analog nature. Replacing such an analog video image signal separating circuit by a digital device contributes largely to a reduction of the size of the circuit.

Further, a video image and audio sound signal processor according to the present invention may include, in addition to such a digital signal processing circuit, a delay circuit for delaying an audio sound signal, and an auxiliary signal multiplexer for multiplexing a delayed audio sound signal onto a video image signal which is outputted by the digital signal processing circuit. Consequently, a total size of a video image and audio sound signal processor including a digital signal processing circuit, a delay circuit, and an auxiliary signal multiplexer becomes smaller than a video image and audio sound signal processor including an analog video image signal separating circuit. Furthermore, the audio sound, which is picked up during a time of a vertical blanking period of the video image signal, may be held for a predetermined time by the above-mentioned delay circuit to be multiplexed with the video image signal, thereby further improving the quality of the audio sound.

Still further, a video image and audio sound signal processor according to the present invention may include a frame memory for memorizing data for one framed image under control of a frame memory control circuit. The frame memory is divided into a sector for video image data and another sector for audio sound data. Therefore, even in an application of playing back a still video image and an audio sound at the same time, an audio sound signal can be outputted together with a video image signal from a frame memory, without a need of an additional memory for the audio sound.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2 is a time chart showing relationships among three signals, a horizontal synchronizing signal of a video image signal, a timing pulse to the signal multiplexer, and an output signal from the signal multiplexer;

FIG. 3 is an illustration explaining an exemplary structure of data blocks;

FIG. 4 is an illustration explaining a structure of data blocks, which is in compliance with an interleave format defined by JPEG (joint photographic experts group);

DESCRIPTION OF THE PREFERRED EMBODIMENTS

Figure 1:
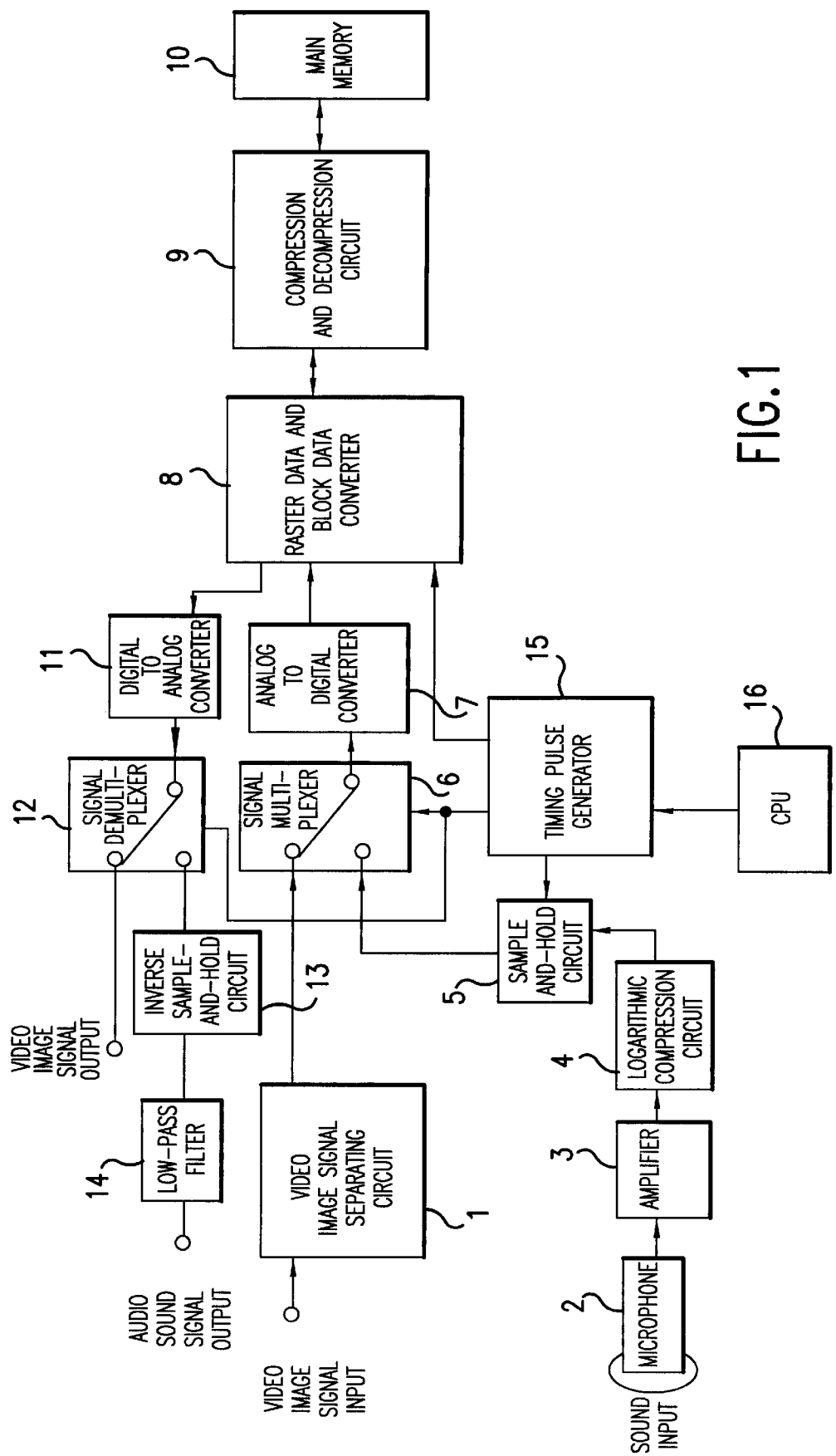
FIG. 1 is a schematic block diagram showing a structure of an embodiment of a video image and audio sound signal processor according to the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is shown a schematic block diagram of an embodiment according to the present invention.

A video image and audio sound signal processor according to the present invention includes as shown in FIG. 1:

a video image signal separating circuit 1 for analyzing and separating a video image input signal from an image pickup unit (not shown in the drawings) into a brightness signal and two color difference signals. Such an image pickup unit includes devices such as, for example, a CCD (charge coupled device), and the like;

a microphone 2 for picking up sound;

an amplifier 3 for amplifying an audio sound signal output by the microphone 2;

a logarithmic compression circuit 4 for performing a logarithmic data compression for the audio sound signal output by the amplifier 3;

a sample-and-hold circuit 5 for sampling an audio sound signal output by the logarithmic compression circuit 4 and holding such a sampled audio sound signal;

a signal multiplexer 6 for multiplexing an output signal from the image signal separating circuit 1 and an output signal from the sample-and-hold circuit 5;

an A/D (analog to digital) converter 7 for converting an analog output signal from the signal multiplexer 6 to a digital signal;

a raster data and block data converter 8 for converting data from the A/D (analog to digital) converter 7 to block data made of, for example, 8 by 8 picture elements;

a compression and decompression circuit 9 for performing data compression for output data from the raster data and block data converter 8 and decompression for data from a main memory 10;

a main memory 10 for storing data output by the compression and decompression circuit 9;

a D/A (digital to analog) converter 11 for converting a digital output signal from the raster data and block data converter 8 to an analog signal when playing back a video image and audio sound;

a signal demultiplexer 12 for demultiplexing an analog output signal from the D/A (digital to analog) circuit 11 into a video image signal and an audio sound signal;

an inverse sample-and-hold circuit 13 for forming an audio sound signal;

a low-pass filter 14 for filtering an audio sound signal from the inverse sample-and-hold circuit 13 to cut a high frequency wave on the audio sound signal;

a timing pulse generator 15 for generating timing pulses; and a CPU (central processing circuit) 16 for controlling the entire system of the video image and audio sound signal processor.

Next, an operation of an embodiment having the above-mentioned structure is explained with respect to FIG. 1. A video image signal is analyzed and separated into a brightness signal and two color difference signals by the video image signal separating circuit 1. On the other hand, a sound signal is picked up by the microphone 2 and is amplified by the amplifier 3 to form an analog sound signal, and then a dynamic range of the analog sound signal is compressed by the logarithmic compression circuit 4. Then, the analog sound signal is sampled by the sample-and-hold circuit 5 in accordance with a timing pulse which is generated by the timing pulse generator 15 in synchronism with a horizontal synchronizing signal of the video image signal. The signal multiplexer 6 multiplexes the video image signal and the audio sound signal, to make a multiplexed signal containing both the video image and the audio sound, in accordance with a timing pulse which is generated by the timing pulse generator 15 in synchronism with the horizontal synchronizing signal of the video image signal. The multiplexed signal output by the signal multiplexer 6 is then converted to a digital signal containing digital video image data and digital audio sound data by the A/D (analog to digital) converter 7.

Next, relationships among three signals, a horizontal synchronizing signal of a video image signal, a timing pulse to the signal multiplexer 6, and an output signal from the signal multiplexer 6, are explained with respect to a timing chart shown in FIG. 2. The timing pulse having a pulse width described below for switching over an input signal to the signal multiplexer 6 is generated in synchronism with the horizontal synchronizing signal of the video image signal, and is timed to the end of a horizontal image effective period of the video image signal. The embodiment of the present invention applies a clock of 14.3 MHz, as an example, and accordingly a time length of a clock for constituting the video image signal is approximately 70 nanoseconds. Further, a time length of the timing pulse is approximately 560 nanoseconds, since the timing pulse is constituted of 8 clocks. When the signal multiplexer 6 is triggered by such a timing pulse, the signal multiplexer 6 outputs an analog signal having a waveform as shown in FIG. 2. Thus, a last 560 nanoseconds of a horizontal image effective period of the video image signal is allocated as a time available for an audio sound signal.

The multiplexed signal, having a video image signal and the audio sound signal thereon, is output by the signal multiplexer 6 in accordance with the above-mentioned timing pulse, and is then converted to a digital signal by the A/D (analog to digital) converter 7, having both digital video image data and digital audio sound data. The image data is formed in a raster form since the image signal is generated by a CCD (charge coupled device). The timing pulse generator 15 provides the raster data and block data converter 8 with a timing pulse for converting raster data of the digital multiplexed signal into block data. The audio sound data on the digital multiplexed signal is also converted into block data by the raster data and block data converter 8.

Next, a structure of the data in the above-mentioned block data format is explained with respect to FIG. 3. In an embodiment according to the present invention, as an example, composite video image and audio sound data for one raster line of the video image signal in a horizontal image effective period of the video image signal is horizontally made of 768 picture elements representing, as an example, brightness data of the video image data and 8 picture elements representing audio sound data following the 768 picture elements. These data are grouped in a block of 8 by 8 picture elements, and thus composite video image and audio sound data for 8 raster lines are formed into 96 blocks of video image data and one block of audio sound data. Every block which is made of 8 by 8 picture elements is then transmitted to the compression and decompression circuit 9, and video image data and audio sound data in a compressed block data form are memorized in the main memory 10. A preferred size of a block is, generally, of 8×8 picture elements as described above and as shown in FIG. 3. However, any size other than 8×8 picture elements may be applied as well. Thus, as shown in FIG. 3, a block of brightness data is made of 8×8 picture elements, and one block is assigned to audio sound data.

In a playback mode of the video image and audio sound signal processor, compressed data stored in the main memory 10 are read out, and sent to the compression and decompression circuit 9 wherein such compressed data are decompressed. And then, the decompressed block data are converted to raster data by the raster data and block data converter 8. The raster data output by the raster data and block data converter 8 are sent to the D/A (digital to analog) converter 11, and converted into an analog raster signal. The analog raster signal is then divided by the signal demultiplexer 12 into an analog video image signal and an analog audio sound signal, whose waveform is in a stepped waveform and is incomplete yet as an audio sound signal. The analog audio sound signal outputted by the signal demultiplexer 12 is then sent to the inverse sample-and-hold circuit 13 and is reformed to be a complete analog signal which keeps synchronism with the horizontal synchronizing signal of the video image signal. And then, an audio sound signal in a complete analog form, which is output from the sample-and-hold circuit 13, is sent to the low-pass filter 14, wherein a high frequency part of a wave is filtered out from the audio sound signal.

A format of the above-mentioned block data may be made as defined in an interleave format of JPEG (joint photography experts group) which is a standard for data compression and decompression for a still-frame picture. In such a standard, four blocks constitute a minimum coding unit to be handled, and in such a minimum coding unit, a first two blocks are assigned for the brightness signal, a third block is assigned for a first color difference signal, and a fourth block is assigned for a second color difference signal, respectively. In this case, it is preferable that audio sound data are arranged in such an interleave format also as shown in FIG. 4. That is, as shown in FIG. 4, 1,536 picture elements or 192 blocks of brightness data and color difference data are provided, and then audio sound data is added, so that a total of 1,560 picture elements or 195 blocks are formed. In FIG. 4, a block of brightness is made of 8×8 picture elements, and a block of color difference data is made of 4×8 picture elements. The JPEG (joint photographic experts group) defines an interleave format of four blocks, a first two blocks for brightness data, a third block for a first color difference data and a fourth block for a second color difference data respectively. And, two blocks of brightness data and two blocks of color difference data are assigned to audio sound data.

By this arrangement, the total data stream, wherein video image data and the audio sound data are contained, is in compliance with the data format specified by the JPEG (joint photographic experts group) and becomes readable by any video image recording and playback apparatus in compliance with JPEG (joint photographic experts group). However, the audio sound data are not readable as an audio sound by such an apparatus in compliance with the JPEG (joint photographic experts group) since such an apparatus does not include a demultiplexer for demultiplexing an audio sound signal from the composite video image and audio sound signal. Thus, the audio sound data are readable as an audio sound only by an apparatus including a video image and audio sound signal processor according to the present invention.

Figure 5:
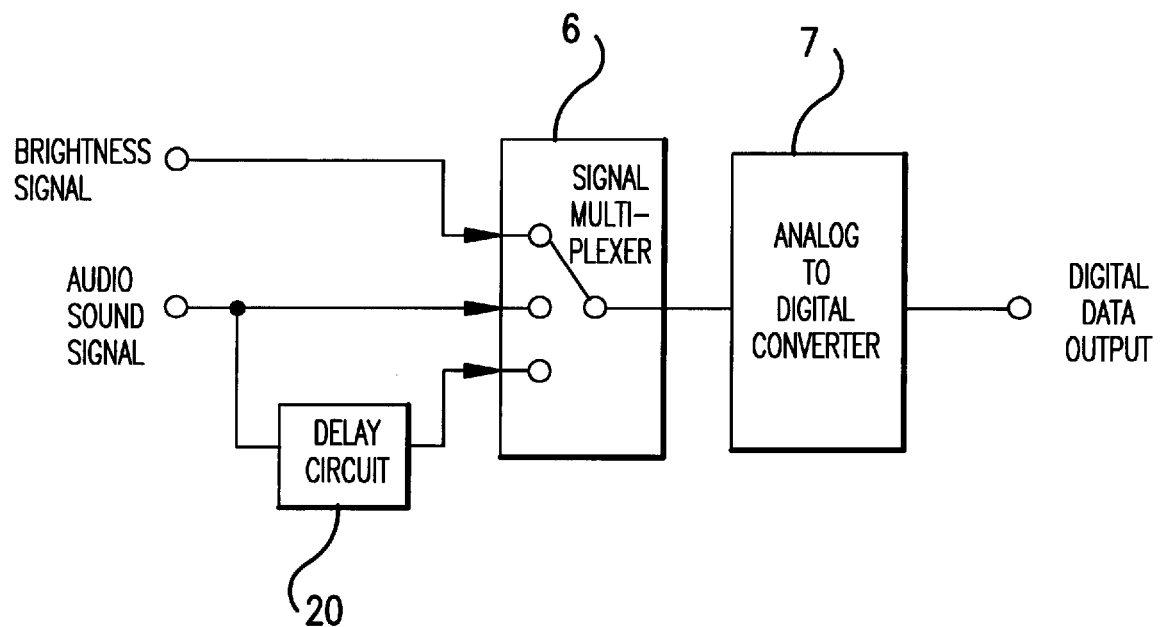
FIG. 5 is a partial schematic block diagram showing a structure of another embodiment of a video image and audio sound signal processor according to the present invention.

Next, a structure of another embodiment according to the present invention is explained with respect to FIG. 5, wherein a part of a schematic block diagram of the another embodiment is illustrated. The embodiment partly illustrated in FIG. 5 has the same structure as that of the embodiment illustrated in FIG. 1, except that a delay circuit 20 is added for delaying the audio sound signal, which is output by the sample-and-hold circuit 5, for a predetermined period of time, and the signal multiplexer 6 multiplexes the output signal from the delay circuit 20, the audio sound signal output by the sample-and-hold circuit 5, and the video image signal (brightness signal) output by the video image signal process circuit 1.

In the embodiment shown in FIG. 5, an audio sound signal is sampled at a faster frequency of approximately 31 KHz, as an example, which is twice as fast as a horizontal synchronizing signal of the video image signal, which is of, as an example, approximately 15.7 KHz in accordance with the NTSC (national television system committee). As a result, a sampling of the audio sound signal is made twice at a beginning of and a middle of a horizontal image effective period of the video image signal. Further, such a sampled audio sound signal at a middle of a horizontal image effective period of the video image signal is held by the delay circuit 20 for a predetermined period of time to be positioned immediately following the audio sound signal sampled at a beginning of a horizontal image effective period of the video image signal. Then, the multiplexer 6 also multiplexes an output signal from the delay circuit 20, in accordance with a timing signal in synchronism with the horizontal synchronizing signal of the video image signal, in addition to the audio sound signal and the video image signal. By such an arrangement as mentioned above, a frequency response may be made superior and a more preferable sound may be reproduced.

Figure 6:
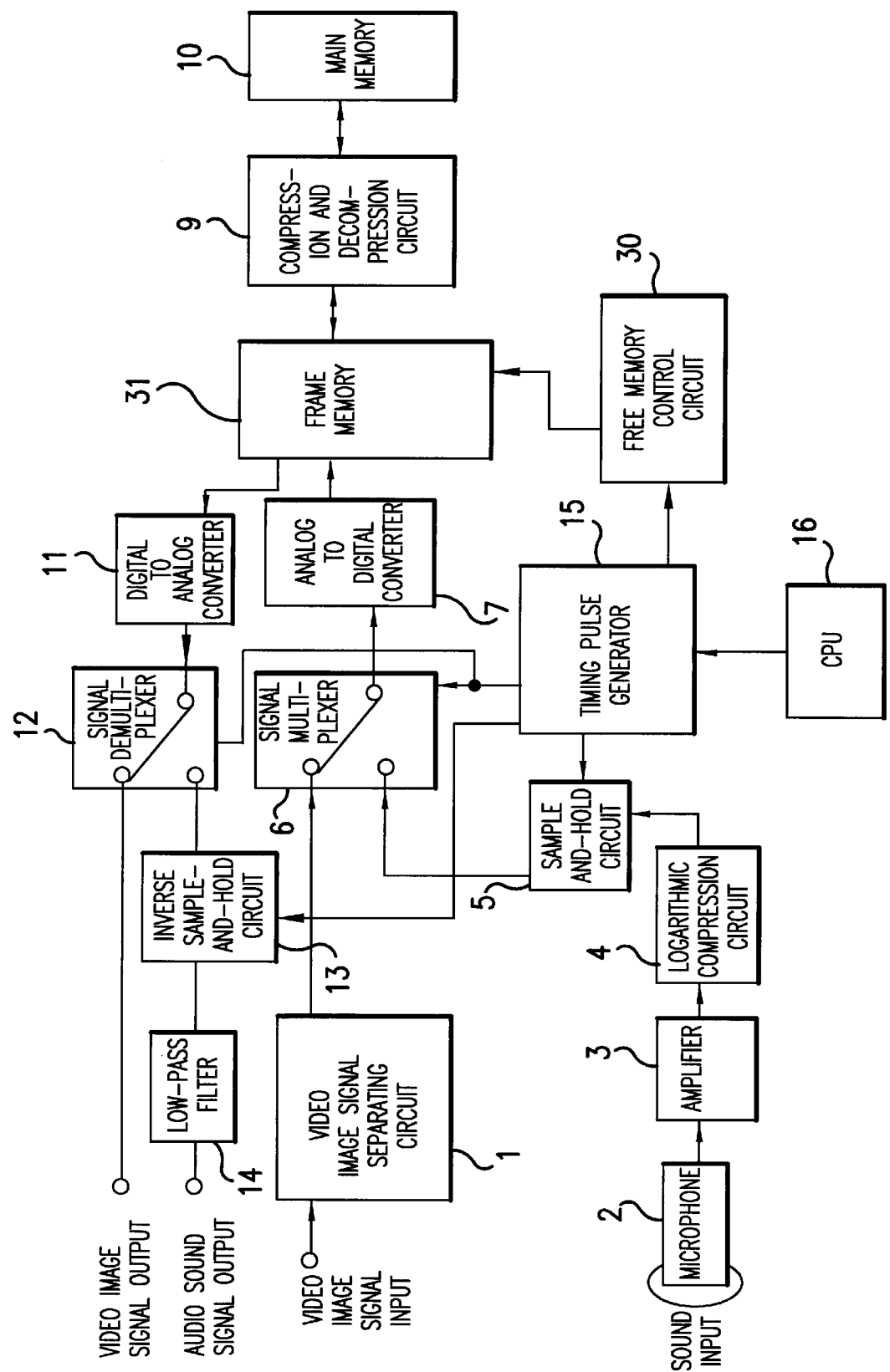
FIG. 6 is a schematic block diagram showing a structure of yet another embodiment of a video image and audio sound signal processor according to the present invention.

Next, a structure of yet another embodiment according to the present invention is explained with respect to FIG. 6. The embodiment of FIG. 6 is for a case that audio sound data are memorized in a frame memory after a still-frame video image data are memorized in the frame memory. A structure of the embodiment in FIG. 6 is identical to that of the embodiment in FIG. 1, except that the raster data and block data converter 8 shown in FIG. 1 is eliminated and a frame memory control circuit 30 and a frame memory 31 are newly provided between the timing pulse generator 15 and the compression and decompression circuit 9. Only such new portions identified with new descriptions and numbers in FIG. 6 will now be described, as the other portions operate as shown in FIG. 1

In this embodiment of FIG. 6, in a recording mode, a video image signal is processed and separated into a brightness signal and color differential signals by the image signal separating circuit 1. The video image signal, which is separated into the brightness signal and the color differential signals, passes through the A/D (analog to digital) converter 7 and is memorized in the frame memory all under control by the frame memory control circuit 30. After completion of memorizing video image data in the frame memory 31, a signal multiplexer 6 switches an input connection from the video image signal to an audio sound signal by control of the timing pulse generator 15, and the audio sound signal is then converted to digital data by the A/D (analog to digital) converter 7. The frame memory is separated into two memory sections, one for video image data and one for audio sound data, and the digital audio sound data are memorized in such a predetermined section in the frame memory 31 under control by the frame memory control circuit 30.

Figure 7:
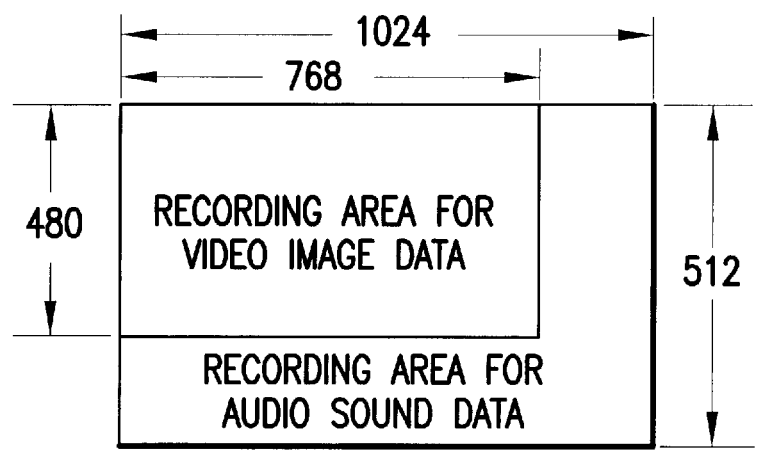
FIG. 7 is an illustration explaining an example of a division of an area in a frame memory for memorizing video image and audio sound separately.

Such a memory division of the frame memory 31 is explained with respect to FIG. 7. In a case that an 8 megabits RAM, as an example, is utilized for a frame memory, approximately 5.9 megabits of the RAM must be assigned for memorizing image data; since the video image in one frame is formed of 768 picture elements horizontally and 480 picture elements vertically in this case, a set of 8 bits is assigned to brightness data for representing one picture element, and another set of 8 bits is assigned to color difference data for representing one picture element. Accordingly, the audio sound data can be memorized in the remaining approximately 2.1 megabits of the RAM, which may be approximately 17 seconds long at a 15 KHz sampling frequency.

The video image data and the audio sound data, which are thus memorized in the frame memory 31, are respectively made in a block data form under control by the frame memory control circuit 30 to be sent to the compression and decompression circuit 9, and then the compressed block data are sent to the main memory card 10 to be stored therein.

In a playback mode of the embodiment shown in FIG. 6, the compressed data are read from the main memory 10 and such output data from the main memory 10 are decompressed by the compression and decompression circuit 9, and the decompressed image data and the decompressed audio sound data are memorized in the frame memory 31 under control by the frame memory control circuit 30. Then, the video image data are output from the frame memory 31, and the audio sound data are also output from the frame memory 31 during a period of a horizontal blanking time of the raster video image signal. The video image data and the audio sound data are then sent to the D/A (digital to analog) converter 11 and converted to analog signals, and furthermore, the analog video image signal and the analog audio sound signal are demultiplexed to be output alternatively by the signal demultiplexer 12. The audio sound signal, which is yet an incomplete analog audio sound signal, is then sent to the inverse sample-and-hold circuit 13, wherein such an incomplete analog audio sound signal is reformed to a complete analog signal which keeps synchronism with the horizontal synchronizing signal of the video image signal under control of the timing pulse generator 15, and a complete audio sound signal is finally output through the low-pass filter 14.

Figure 8A:
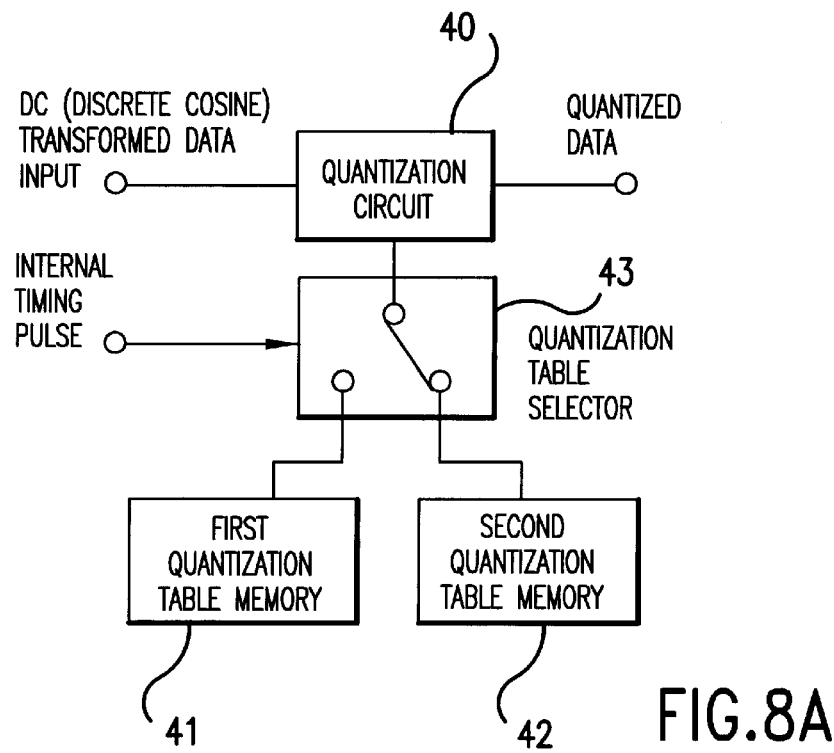
FIG. 8(a) is an illustration explaining an exemplary structure of a device for performing quantization.
Figure 8B:
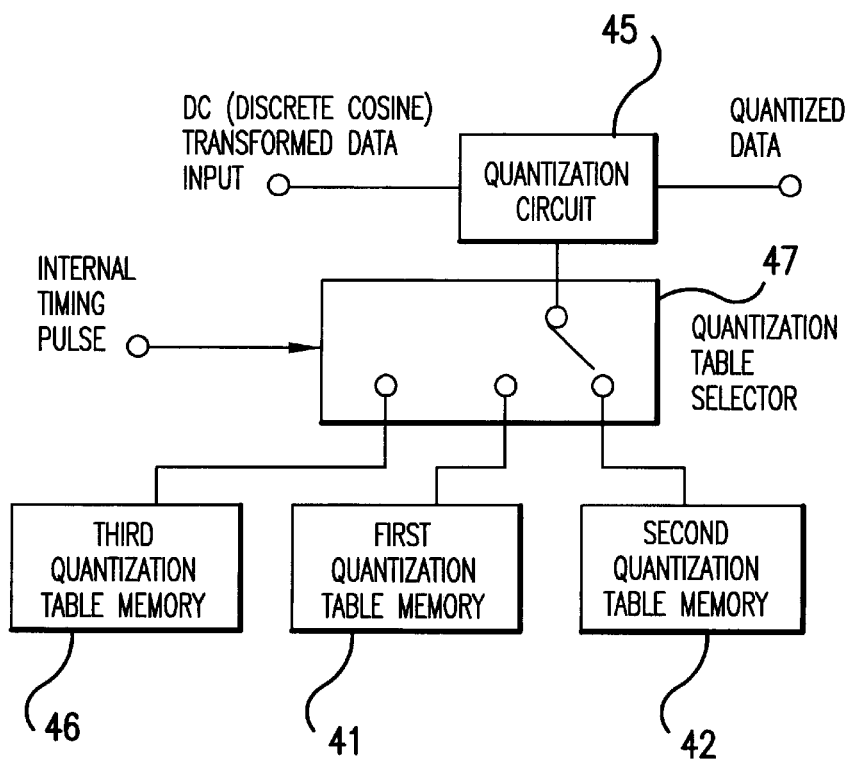
FIG. 8(b) is an illustration explaining another exemplary structure of a device for performing quantization.

Next, exemplary structures of a device for performing quantization, which is integrated in the above-mentioned compression and decompression circuits 9, are explained with respect to FIGS. 8(a) and 8(b).

An example of a device for performing quantization, which is illustrated in FIG. 8(a), includes:

a quantization circuit 40 for performing quantization for the data output by a DCT (discrete cosine transform) device (not shown in the drawings);

a first quantization table memory 41 for memorizing a quantizing table for the color difference signals;

a second quantization table memory 42 for memorizing a quantizing table for the brightness signal; and a quantization table selector 43 for selecting the first quantization table memory 41 or the second quantization table memory 42 in accordance with the data output by the DCT (discrete cosine transform) device.

The quantization table for the color difference signals which is memorized in the first quantization table memory 41 is also used for quantizing the audio sound.

Another example of a quantization device, which is illustrated in FIG. 8(b), includes:

a quantization circuit 45 for performing quantization for the data output by a DCT (discrete cosine transform) device (not shown in the drawings);

a first quantization table memory 41 for memorizing a quantizing table for the color difference signals;

a second quantization table memory 42 for memorizing a quantizing table for the brightness signal;

a third quantization table memory 46 for memorizing a quantizing table for the audio sound data; and a quantization table selector 47 for selecting one of the quantization table memories from among the first quantizationable memory 41, the second quantization table memory 42, and the third quantization table memory 46 in accordance with the data output by the DCT (discrete cosine transform) device.

Figure 9:
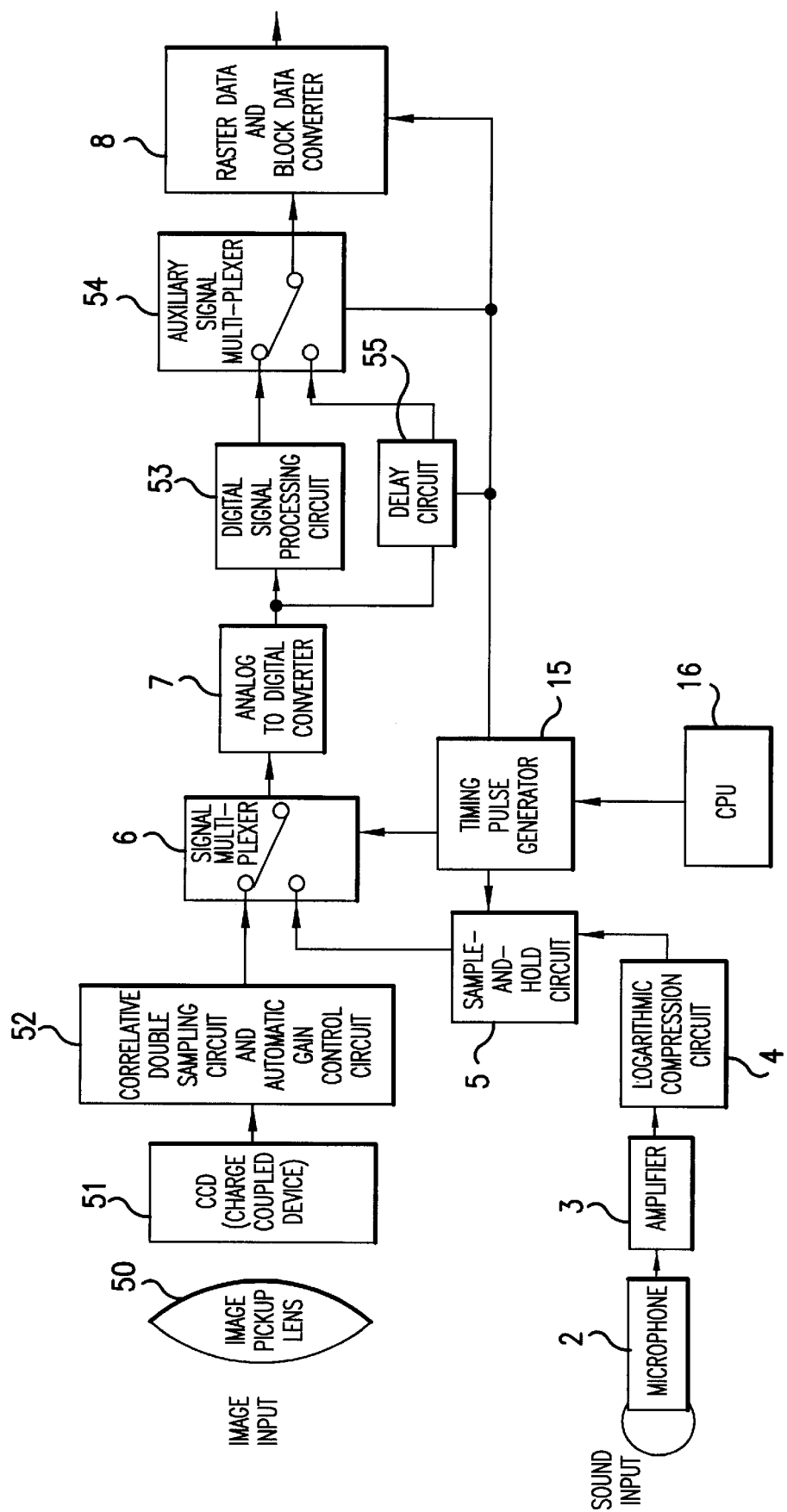
FIG. 9 is a partial schematic block diagram showing a structure of still another embodiment of a video image and audio sound signal processor according to the present invention.

Next, a structure of another embodiment according to the present invention is explained with respect to FIG. 9. A structure of the embodiment in FIG. 9 is identical to that of the embodiment in FIG. 1, except that the video image processing circuit 1 is replaced by a digital signal processing circuit 53, and an auxiliary signal multiplexer 54 and a delay circuit 55 are added. In this embodiment, a light of a subject is focused through an image pickup lens 50 onto the surface of a CCD (charge coupled device) 51, and is then converted into an electrical signal. An output signal from the CCD (charge coupled device) 51 is rectified by eliminating noises and amplified by a correlative double sampling and auto gain control circuit 52. On the other hand, the audio sound signal, which is input through the microphone 2, is multiplexed with the output signal from the correlative double sampling and auto gain control circuit 52 in accordance with a timing signal which is in synchronism with the horizontal synchronizing signal of the video image signal under control of the CPU 16, and the audio signal is then output to the A/D(analog to digital) converter 7. The A/D (analog to digital) converter 7 converts such a multiplexed analog signal to a multiplexed digital signal.

The video image data in the multiplexed digital signal are then input to the digital signal processing circuit 53, and are separated into a brightness signal and color difference signals. On the other hand, the audio sound data of the digital multiplexed signal are input to the delay circuit 55 in place of the digital signal processing circuit 53, and delayed for a predetermined time so as to maintain synchronization between the audio sound signal output by the delay circuit 55 and the video image signal output by the digital signal process circuit 53. Thus, the video image signal, which contains the brightness signal and color difference signals, and the audio sound signal are multiplexed by the auxiliary signal multiplexer 54. Such a multiplexed signal is then output to the raster data and block data converter 8, wherein the video image data and the audio sound data are converted into block data.

The above-mentioned delay circuit 55 also holds the audio sound signal during a time of a vertical blanking period of the image signal under control by the CPU 16. After completion of transmitting the video image signal for forming one video image frame to the raster data and block data converter 8, the audio sound signal, which is held in the delay circuit 55, is output to the raster data and block data converter 8 and is further output to a compression circuit which is not shown in the drawings.

Figure 10:
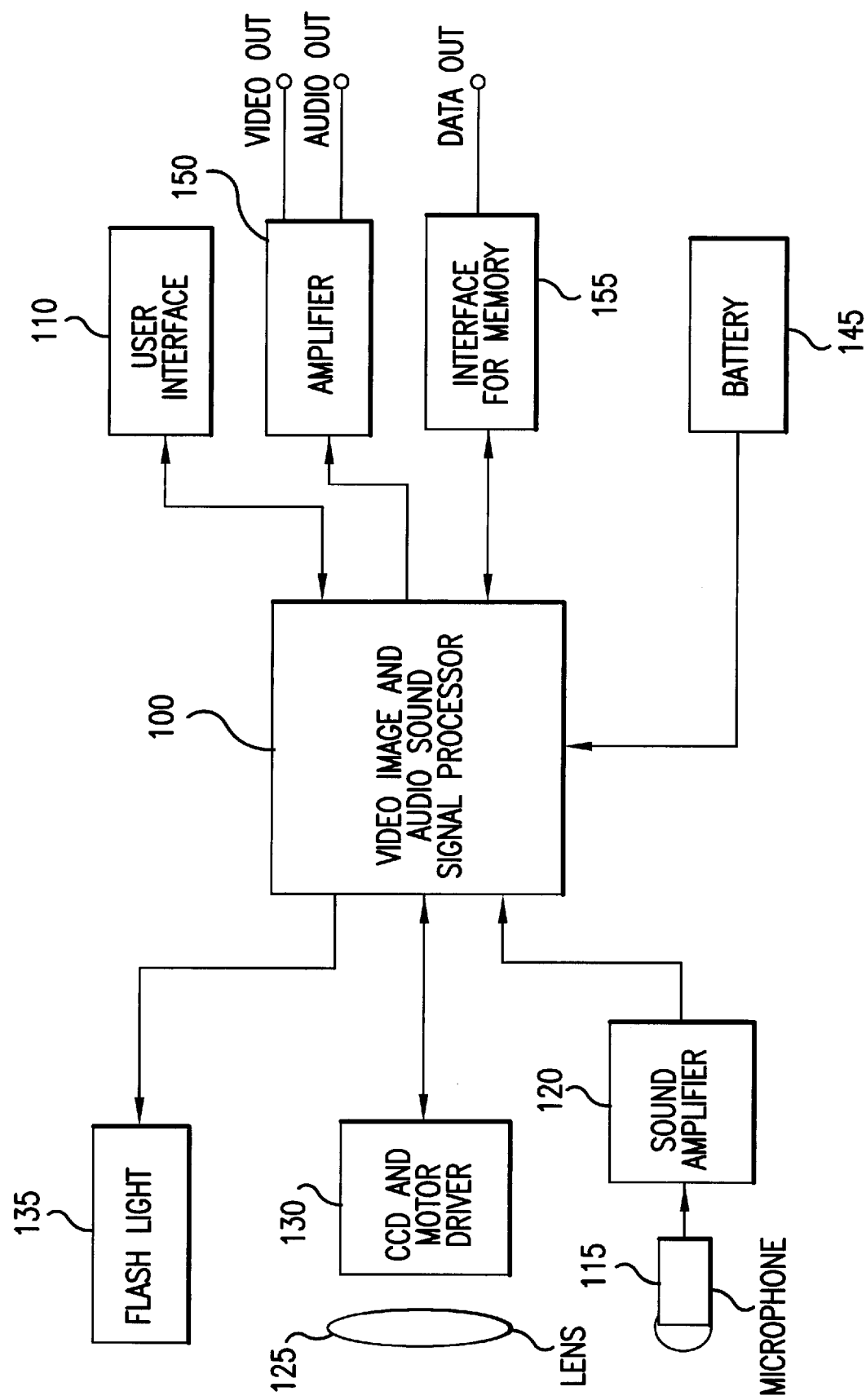
FIG. 10 is a schematic block diagram showing a structure of an embodiment of a digital video recording and playback apparatus including a video image and audio sound signal processor according to the present invention.

FIG. 10 shows one application of the device of the present invention to a digital video camera. As shown in FIG. 10, such a digital video camera includes a video image and audio sound signal processor 100, which corresponds to the device of the present invention as discussed in the embodiments above.

Such a digital video camera of the present invention includes a microphone 115 and a sound amplifier 120 providing a sound signal to the video image and audio sound signal processor 100. Further, a lens 125 and a charge coupled device and motor driver 130 provide a visual signal to the video image and audio sound signal processor 100. A flash light 135 and battery 145 can also be connected to the video image and audio signal processor 100. An interface for memory 155 is also provided, which can provide an interface between the video image and audio sound signal processor 100 and a further memory (not shown) to store data. Furthermore, such a digital video camera may also have video out and audio out outputs, which pass through amplifier 150. A user interface 110 is also provided so that a user can have control over the video image and audio sound signal processor 100.

Figure 11:
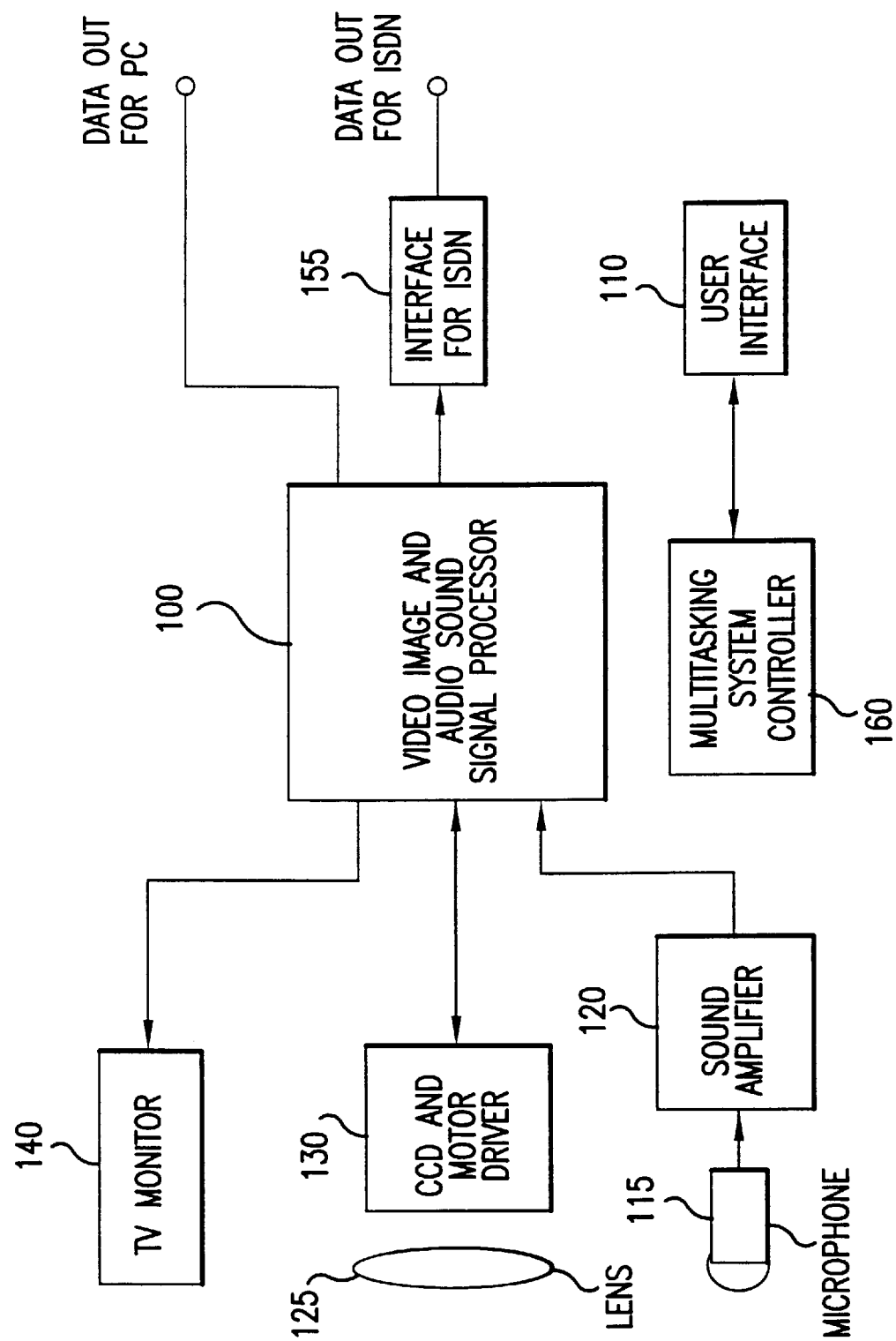
FIG. 11 is a schematic block diagram showing a structure of an embodiment of a digital TV conferencing system including a video image and audio sound signal processor according to the present invention.

FIG. 11 shows another application of the device of the present invention in a digital television conferencing system. Similar elements from FIG. 11 as in FIG. 10 are given by similar reference numbers, and a redundant description thereof is omitted.

The device of FIG. 11 utilizes a multitasking system controller 160 formed between user interface 110 and the video image and audio sound signal processor 100. This multi-tasking system controller 160 is utilized to control tasking features of the digital television conferencing system. The system of FIG. 11 also utilizes a TV monitor 140 and an interface for ISDN 155 for outputting data for an ISDN format. Such a system of FIG. 11 may also have a data out for a PC from the video images and audio sound signal processor 100.

Obviously, numerous additional modifications and variations of the present invention are possible in light of the above teachings. It is therefore to be understood that within the scope of the appended claims, the present invention may be practiced otherwise than as specifically described herein.

What is claimed as new and is Desired to be Secured by Letters: Patent of the United States is:

1. A video image and studio sound signal processor, comprising:

a sample-and-hold circuit for sampling an analog audio sound signal in synchronism with a horizontal synchronizing signal of an analog video image signal, and for holding such a sampled analog audio sound signal to output a held analog audio sound signal;

a signal multiplexer for multiplexing said analog video image signal and said held analog audio sound signal output by said sample-and-hold circuit;

a timing pulse generator for generating a timing pulse for controlling said signal multiplexer;

a first converter for converting an analog multiplexed signal including said analog video image signal and said analog audio sound signal output from said signal multiplexer into a digital signal;

a second converter for converting an output from said first converter into a plurality of data blocks; and a data compressor for compressing video image data and audio sound data, which are converted into compressed data blocks by said second converter, in a unit of a block.

2. A video image and audio sound signal processor according to claim 1, further comprising:

a data decompressor for decompressing the compressed block data in a unit of a block;

a third converter for converting said block data, which are decompressed by said data decompressor, into raster data;

a fourth converter for converting an output from said third converter into an analog signal;

a signal demultiplexer for separating an output from said fourth converter into a video image signal and an audio sound signal;

an inverse sample-and-hold circuit for forming an audio sound signal from said audio sound signal output from said signal demultiplexer in synchronism with a horizontal synchronizing signal of said video image signal; and a low-pass filter for filtering an output from said inverse sample-and-hold circuit.

3. A video image and audio sound signal processor according to claim 1, wherein output data blocks from said second converter include a plurality of audio sound blocks so as to conform to a block interleave format comprised of a plurality of brightness data blocks and a plurality of color difference data blocks.

4. A video image and audio sound signal processor according to claim 1, further comprising a delay circuit for delaying an output from said sample-and-hold circuit, in accordance with an output signal from said timing pulse generator, and wherein said signal multiplexer multiplexes an output from said delay circuit, an output of said video image signal, and an output from said sample-and-hold circuit, thereby increasing a sampling frequency of the audio sound signal.

5. A video image and audio sound signal processor according to claim 3, further comprising a delay circuit for delaying an output from said sample-and-hold circuit, in accordance with an output signal from said timing pulse generator, and wherein said signal multiplexer multiplexes an output from said delay circuit, an output of said video image signal, and an output from said sample-and-hold circuit, thereby increasing a sampling frequency of the audio sound signal.

6. A video image and audio sound signal processor according to claim 1, further comprising:
   a plurality of quantization table memories, each quantization table memorizing a predetermined quantization table, and one of said quantization table memories memorizing a predetermined quantization table for quantizing audio sound data exclusively; and
   a selector for selecting a single quantization table memory from among the plurality of quantization table memories.

7. A video image and audio sound signal processor according to claim 3, further comprising:
   a plurality of quantization table memories, each quantization table memorizing a predetermined quantization table, and one of said quantization table memories memorizing a predetermined quantization table for quantizing audio sound data exclusively; and
   a selector for selecting a single quantization table memory from among the plurality of quantization table memories.

8. A video image and audio sound signal processor according to claim 4, further comprising:
   a plurality of quantization table memories each quantization table memorizing a predetermined quantization table, and one of said quantization table memories memorizing a predetermined quantization table for quantizing audio sound data exclusively; and
   a selector for selecting a single quantization table memory from among the plurality of quantization table memories.

9. A video image and audio sound signal processor according to claim 1, further comprising:
   a plurality of quantization table memories, each quantization table memorizing a predetermined quantization table, and one of said quantization table memories memorizing a predetermined quantization table for quantizing both video image data and audio sound data; and
   a selector for selecting a single quantization table memory from among the plurality of quantization table memories.

10. A video image and audio sound signal processor according to claim 3, further comprising:
    a plurality of quantization table memories each quantization table memorizing a predetermined quantization table, and one of said quantization table memories memorizing a predetermined quantization table for quantizing both video image data and audio sound data; and
    a selector for selecting a single quantization table memory from among the plurality of quantization table memories.

11. A video image and audio sound signal processor according to claim 4, further comprising:
    a plurality of quantization table memories, each quantization table memorizing a predetermined quantization table, and one of said quantization table memories memorizing a predetermined quantization table for quantizing both video image data and audio sound data; and
    a selector for selecting a single quantization table memory from among the plurality of said quantization table memories.

12. A video image and audio sound signal processor according to claim 1, wherein said signal multiplexer multiplexes a video image signal from a CCD (charge coupled device) and an audio sound signal, said video image and audio sound signal processor further comprising:
    a delay circuit for delaying said audio sound signal;
    a digital signal processing circuit for separating an output from said CCD (charge coupled device) into a brightness signal and a plurality of color difference signals; and
    a second multiplexer for multiplexing said audio sound data and an output from said digital signal processing circuit.

13. A video image and audio sound signal processor according to claim 3, wherein said signal multiplexer multiplexes a video image signal from a CCD (charge coupled device) and an audio sound signal, said video image and audio sound signal processor further comprising:
    a delay circuit for delaying said audio sound signal;
    a digital signal processing circuit for separating an output from said CCD (charge coupled device) into a brightness signal and a plurality of color difference signals; and
    a second multiplexer for multiplexing said audio sound data and an output from said digital signal processing circuit.

14. A video image and audio sound signal processor according to claim 4, wherein said signal multiplexer multiplexes a video image signal from a CCD (charge coupled device) and an audio sound signal, said video image and audio sound signal processor further comprising:
    a delay circuit for delaying said audio sound signal;
    a digital signal processing circuit for separating an output from said CCD (charge coupled device) into a brightness signal and a plurality of color difference signals; and
    a second multiplexer for multiplexing said audio sound data and an output from said digital signal processing circuit.

15. A video image and audio sound signal processor according to claim 6, wherein said signal multiplexer multiplexes a video image signal from a CCD (charge coupled device) and an audio sound signal, said video image and audio sound signal processor further comprising:
    a delay circuit for delaying said audio sound signal;
    a digital signal processing circuit for separating an output from said CCD (charge coupled device) into a brightness signal and a plurality of color difference signals; and
    a second multiplexer for multiplexing said audio sound data and an output from said digital signal processing circuit.

16. A video image and audio sound signal processor according to claim 9, wherein said signal multiplexer multiplexes a video image signal from a CCD (charge coupled device) and an audio sound signal, said video image and audio sound signal processor further comprising:

a delay circuit for delaying said audio sound signal;

a digital signal processing circuit for separating an output from said CCD (charge coupled device) into a brightness signal and a plurality of color difference signals; and a second multiplexer for multiplexing said audio sound data and an output from said digital signal processing circuit.

17. A video image and audio sound signal processor according to claim 1, further comprising:

a memory for memorizing said video image data and audio sound data; and a memory control circuit for controlling addressing for memorizing said audio sound data in a first area in said memory and for memorizing said video image data in a second area in said memory.

18. A video image and audio sound signal processor according to claim 3, further comprising:

a memory for memorizing said video image data and audio sound data; and a memory control circuit for controlling addressing for memorizing said audio sound data in a first area in said memory and for memorizing said video image data in a second area in said memory.

19. A video image and audio sound signal processor according to claim 4, further comprising:

a memory for memorizing said video image data and audio sound data; and a memory control circuit for controlling addressing for memorizing said audio sound data in a first area in said memory and for memorizing said video image data in a second area memory.

20. A video image and audio sound signal processor according to claim 6, further comprising:

a memory for memorizing said video image data and audio sound data; and a memory control circuit for controlling addressing for memorizing said audio sound data in a first area in said memory and for memorizing said video image data in a second area in said memory.

21. A video image and audio sound signal processor According to claim 9, further comprising:

a memory for memorizing said video image data and audio sound data; and a memory control circuit for controlling addressing for memorizing said audio sound data in a first area in said memory and for memorizing said video image data in a second area in said memory.

22. A video image and audio sound signal processor according to claim 13, further comprising:

a memory for memorizing said video image data and audio sound data; and a memory control circuit for controlling addressing for memorizing said audio sound data in a first area in said memory and for memorizing said video image data in a second area in said memory.

23. A video image and audio sound signal processor according to claim 1, wherein said signal multiplexer multiplexes the analog video image signal and the analog audio sound signal so that an analog audio sound signal is inserted immediately following an end of the video image signal for a raster line.

24. A video image and audio sound signal processor according to claim 3, wherein said signal multiplexer multiplexes the analog video image signal and the analog audio sound signal so that the analog audio sound signal is inserted immediately following an end of the video image signal for a raster line.

25. A video image and audio sound signal processor according to claim 4, wherein said signal multiplexer multiplexes the analog video image signal and the analog audio sound signal so that the analog audio sound signal is inserted immediately following an end of the video image signal for a raster line.

26. A video image and audio sound signal processor according to claim 6, wherein said signal multiplexer multiplexes the analog video image signal and the analog audio sound signal so that the analog audio sound signal is inserted immediately following an end of the video image signal for a raster line.

27. A video image and audio sound signal processor according to claim 9, wherein said signal multiplexer multiplexes the analog video image signal and the analog audio sound signal so that the analog audio sound signal is inserted immediately following an end of the video image signal for a raster line.

28. A video image and audio sound signal processor according to claim 13, wherein said signal multiplexer multiplexes the analog video image signal and the analog audio sound signal so that the analog audio sound signal is inserted immediately following an end of the video image signal for a raster line.

29. A video image and audio sound signal processor according to claim 18, wherein said signal multiplexer multiplexes the analog video image signal and the analog audio sound signal so that the analog audio sound signal is inserted immediately following an end of the video image signal for a raster line.

30. A digital video recording and playback apparatus, including a video image and audio sound signal processor, comprising:

a sample-and-hold circuit for sampling an analog audio sound signal in synchronism with a horizontal synchronizing signal of an analog video image signal, and for holding such a sampled analog audio sound signal to output a held analog audio sound signal;

a signal multiplexer for multiplexing said analog video image signal and said held analog audio sound signal output by said sample-and-hold circuit;

a timing pulse generator for generating a timing pulse for controlling said signal multiplexer;

a first converter for converting an analog multiplexed signal including said analog video image signal and said analog audio sound signal output from said signal multiplexer into a digital signal;

a second converter for converting an output from said first converter into a plurality of data blocks; and a data compressor for compressing video image data and audio sound data, which are converted into compressed data blocks by said second converter, in a unit of a block.

31. A digital video recording and playback apparatus according to claim 30, wherein said video image and audio sound signal processor further comprises:

a data decompressor for decompressing the compressed block data in a unit of a block;

a third converter for converting said block data, which are decompressed by said data decompressor, into raster data;

a fourth converter for converting an output from said third converter into an analog signal;

a signal demultiplexer for separating an output from said fourth converter into a video image signal and an audio sound signal;

an inverse sample-and-hold circuit for forming an audio sound signal from said audio sound signal output from said signal demultiplexer in synchronism with a horizontal synchronizing signal of said video image signal; and a low-pass filter for filtering an output from said inverse sample-and-hold circuit.

32. A digital video recording and playback apparatus according to claim 30, wherein an output from said second converter includes a plurality of audio sound blocks so as to conform to a block interleave format comprised of a plurality of brightness data blocks and a plurality of color difference data blocks.

33. A digital video recording and playback apparatus according to claim 30, wherein said video image and audio sound signal processor further comprises a delay circuit for delaying an output from said sample-and-hold circuit, in accordance with an output signal from said timing pulse generator, and wherein said signal multiplexer multiplexes an output from said delay circuit output of said video image signal, and an output from said sample-and-hold circuit, thereby increasing a sampling frequency of an audio sound signal.

34. A digital video recording and playback apparatus according to claim 32, wherein said video image and audio sound signal processor further comprises a delay circuit for delaying an output from said sample-and-hold circuit, in accordance with an output signal from said timing pulse generator, and wherein said signal multiplexer multiplexes output from said delay circuit, an output of said video image signal, and an output from said sample-and-hold circuit, thereby increasing a sampling frequency of an audio sound signal.

35. A digital video recording and playback apparatus according to claim 30, said video image and audio sound processor further comprising:

a plurality of quantization table memories, each quantization table for memorizing a predetermined quantization table and one of said quantization table memories memorizing a predetermined quantization table for quantizing audio sound data exclusively; and a selector for selecting a single quantization table memory among from the plurality of quantization table memories.

36. A digital video recording and playback apparatus according to claim 32, said video image and audio sound processor further comprising:

a plurality of quantization table memories, each quantization table memorizing a predetermined quantization table and one of said quantization table memories memorizing a predetermined quantization table for quantizing audio sound data exclusively; and a selector for selecting a single quantization table memory from among the plurality of quantization table memories.

37. A digital video recording and playback apparatus according to claim 33, said video image and audio sound processor further comprising:

a plurality of quantization table memories, each quantization table memorizing a predetermined quantization table and one of said quantization table memories memorizing a predetermined quantization table for quantizing audio sound data exclusively; and a selector for selecting a single quantization table memory from among the plurality of quantization table memories.

38. A digital video recording and playback apparatus according to claim 30, said video image and audio sound processor further comprising:

a plurality of quantization table memories, each quantization table memorizing a predetermined quantization table and one of said quantization table memories memorizing a predetermined quantization table for quantizing both video image data and audio sound data; and a selector for selecting a single quantization table memory from among the plurality of quantization table memories.

39. A digital video recording and playback apparatus according to claim 32, said video image and audio sound processor further comprising:

a plurality of quantization table memories, each quantization table memorizing a predetermined quantization table and one of said quantization table memories memorizing a predetermined quantization table for quantizing both video image data and audio sound data; and a selector for selecting a single quantization table memory from among the plurality of quantization table memories.

40. A digital video recording and playback apparatus according to claim 33, said video image and audio sound processor further comprising:

a plurality of quantization table memories, each quantization table memorizing a predetermined quantization table and one of said quantization table memories memorizing a predetermined quantization table for quantizing both video image data and audio sound data; and a selector for selecting a single quantization table memory from among the plurality of quantization table memories.

41. A digital video recording and playback apparatus according to claim 30, wherein said signal multiplexer multiplexes a video image signal from a CCD (charge coupled device) and an audio sound signal, said video image and audio sound signal processor further comprising:

a delay circuit for delaying said audio sound signal;

a digital signal processing circuit for separating an output from said CCD (charge coupled device) into a brightness signal and a plurality of color difference signals; and a second multiplexer for multiplexing said audio sound data and an output from said digital signal processing circuit.

42. A digital video recording and playback apparatus according to claim 32, wherein said signal multiplexer multiplexes a video image signal from a CCD (charge coupled device) and an audio sound signal, said video image and audio sound signal processor further comprising:

a delay circuit for delaying said audio sound signal;

a digital signal processing circuit for separating an output from said CCD(charge coupled device) into a brightness signal and a plurality of color difference signals; and a second multiplexer for multiplexing said audio sound data and an output from said digital signal processing circuit.

43. A digital video recording and playback apparatus according to claim 33, wherein said signal multiplexer multiplexes a video image signal from a CCD (charge coupled device) and an audio sound signal, said video image and audio sound signal processor further comprising:

a delay circuit for delaying said audio sound signal;

a digital signal processing circuit for separating an output from said CCD (charge coupled device) into a brightness signal and a plurality of color difference signals; and a second multiplexer for multiplexing said audio sound data and an output from said digital signal processing circuit.

44. A digital video recording and playback apparatus according to claim 35, wherein said signal multiplexer multiplexes a video image signal from a CCD (charge coupled device) and an audio sound signal, said video image and audio sound signal processor further comprising:

a delay circuit for delaying said audio sound signal;

a digital signal processing circuit for separating an output from said CCD (charge coupled device) into a brightness signal and a plurality of color difference signals; and a second multiplexer for multiplexing said audio sound data and an output from said digital signal processing circuit.

45. A digital video recording and playback apparatus according to claim 38, wherein said signal multiplexer multiplexes a video image signal from a CCD (charge coupled device) and an audio sound signal, said video image and audio sound signal processor further comprising:

a delay circuit for delaying said audio sound signal;

a digital signal processing circuit for separating an output from said CCD (charge coupled device) into a brightness signal and a plurality of color difference signals; and a second multiplexer for multiplexing said audio sound data and an output from said digital signal processing circuit.

46. A digital video recording and playback apparatus according to claim 30, said video image and audio sound signal processor further comprising:

a memory for memorizing said video image data and audio sound data; and a memory control circuit for controlling addressing for memorizing said audio sound data in a first area in said memory and for memorizing said video image data in a second area in said memory.

47. A digital video recording and playback apparatus according to claim 32, said video image and audio sound signal processor further comprising:

a memory for memorizing said video image data and audio sound data; and a memory control circuit for controlling addressing for memorizing said audio sound data in a first area in said memory and for memorizing said video image data in a second area in said memory.

48. A digital video recording and playback apparatus according to claim 33, said video image and audio sound signal processor further comprising:

a memory for memorizing said video image data and audio sound data; and a memory control circuit for controlling addressing for memorizing said audio sound data in a first area in said memory and for memorizing said video image data in a second area in said memory.

49. A digital video recording and playback apparatus according to claim 35, said video image and audio sound signal processor further comprising:

a memory for memorizing said video image data and audio sound data; and a memory control circuit for controlling addressing for memorizing said audio sound data in a first area in said memory and for memorizing said video image data in a second area in said memory.

50. A digital video recording and playback apparatus according to claim 38, said video image and audio sound signal processor further comprising:

a memory for memorizing said video image data and audio sound data; and a memory control circuit for controlling addressing for memorizing said audio sound data in a first area in said memory and for memorizing said video image data in a second area in said memory.

51. A digital video recording and playback apparatus according to claim 41, said video image and audio sound signal processor further comprising:

a memory for memorizing said video image data and audio sound data; and a memory control circuit for controlling addressing for memorizing said audio sound data in a first area in said memory and for memorizing said video image data in a second area in said memory.

52. A digital video recording and playback apparatus according to claim 30, wherein said signal multiplexer multiplexes the analog video image signal and the analog audio sound signal so that the analog audio sound signal is inserted immediately following an end of the video image signal for a raster line.

53. A digital video recording and playback apparatus according to claim 32, wherein said signal multiplexer multiplexes the analog video image signal and the analog audio sound signal so that the analog audio sound signal is inserted immediately following an end of the video image signal for a raster line.

54. A digital video recording and playback apparatus according to claim 33, wherein said signal multiplexer multiplexes the analog video image signal and the analog audio sound signal so that the analog audio sound signal is inserted immediately following an end of the video image signal for a raster line.

55. A digital video recording and playback apparatus according to claim 35, wherein said signal multiplexer multiplexes the analog video image signal and the analog audio sound signal so that the analog audio sound signal is inserted immediately following an end of the video image signal for a raster line.

56. A digital video recording and playback apparatus according to claim 38, wherein said signal multiplexer multiplexes the analog video image signal and the analog audio sound signal so that the analog audio sound signal is inserted immediately following an end of the video image signal for a raster line.

57. A digital video recording and playback apparatus according to claim 41, wherein said signal multiplexer multiplexes the analog video image signal and the analog audio sound signal so that the analog audio sound signal is inserted immediately following an end of the video image signal for a raster line.

58. A digital video recording and playback apparatus according to claim 46, wherein said signal multiplexer multiplexes the analog video image signal and the analog audio sound signal so that the analog audio sound signal is inserted immediately following an end of the video image signal for a raster line.

* * * * *